US012673624B2

(12) United States Patent
Nakamura

(10) Patent No.: US 12,673,624 B2
(45) Date of Patent: Jul. 7, 2026

(54) HIGH-VOLTAGE CABLE PROTECTION STRUCTURE

(71) Applicant: TOYOTA JIDOSHA KABUSHIKI KAISHA, Toyota (JP)

(72) Inventor: Takenori Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 18/406,390

(22) Filed: Jan. 8, 2024

(65) Prior Publication Data

US 2024/0343211 A1 Oct. 17, 2024

(30) Foreign Application Priority Data

Apr. 11, 2023 (JP) ................................. 2023-064423

(51) Int. Cl.
B60R 16/02 (2006.01)

(52) U.S. Cl.
CPC ..... B60R 16/0215 (2013.01); B60Y 2410/115 (2013.01)

(58) Field of Classification Search
CPC ...................... B60R 16/0215; B60Y 2410/115
See application file for complete search history.

(56) References Cited

U.S. PATENT DOCUMENTS

2009/0120661 A1* 5/2009 Inoue ................... B60R 16/0215
174/110 SR
2023/0133401 A1* 5/2023 Tanaka ................. H01B 7/0045
174/72 A

FOREIGN PATENT DOCUMENTS

JP 2007-131237 A 5/2007
JP 2018-122825 A 8/2018

* cited by examiner

*Primary Examiner* — Jason D Shanske
*Assistant Examiner* — Matthew James O'Neill
(74) *Attorney, Agent, or Firm* — SoraIP, Inc.

(57) ABSTRACT

The high-voltage cable protection structure of the present disclosure is a high-voltage cable protection structure that protects a high-voltage cable extending from an electrical device mounted in a front compartment of a vehicle to the rear of the vehicle. Also, in the front compartment, rear parts are arranged behind the electrical device in a vehicle front-rear direction, and a first protection member that covers the high-voltage cable, and a second protection member that is more rigid than the first protection member and that is arranged to cover the high-voltage cable outside the first protection member in a narrower area than the first protection member are included.

5 Claims, 2 Drawing Sheets

HIGH-VOLTAGE CABLE PROTECTION STRUCTURE

CROSS-REFERENCE TO RELATED APPLICATION

This application claims priority to Japanese Patent Application No. 2023-064423 filed on Apr. 11, 2023, incorporated herein by reference in its entirety.

BACKGROUND

1. Technical Field

The present disclosure relates to a high-voltage cable protection structure.

2. Description of Related Art

Japanese Unexamined Patent Application Publication No. 2018-122825 (JP 2018-122825 A) discloses a technology that protects a connector, provided on the rear side of a power converter mounted in a front compartment of a vehicle and to which a high-voltage cable is connected, from impact during a vehicle collision using a protection member.

SUMMARY

In a high-voltage cable protection structure that protects a high-voltage cable that extends toward the vehicle rear side from an electric device mounted in a front compartment of a vehicle, there is room for improvement in the performance of the protective member to protect the high-voltage cable and in the cost.

The present disclosure has been made in view of the above issue, and an object of the present disclosure is to provide a high-voltage cable protection structure that can improve the performance to protect a high-voltage cable in the event of a vehicle collision while suppressing the cost.

In order to address the above issue and achieve the object, an aspect of the present disclosure provides a high-voltage cable protection structure that protects a high-voltage cable that extends toward a vehicle rear side from an electric device mounted in a front compartment of a vehicle, in which:

a rear component is disposed on the vehicle rear side with respect to the electric device in the front compartment; and the high-voltage cable protection structure comprises a first protection member that covers the high-voltage cable, and a second protection member having higher rigidity than the first protection member and disposed outside the first protection member so as to cover the high-voltage cable in a narrower range than the first protection member.

In the high-voltage cable protection structure according to the present disclosure, the high-voltage cable is partially covered by the highly rigid second protection member. Consequently, it is possible to improve the performance to protect the high-voltage cable in the event of a vehicle collision while suppressing the cost.

In addition, in the above, the second protection member may be disposed between the high-voltage cable and the rear component.

Consequently, it is possible to reduce the mass and the material cost of the second protection member.

In addition, in the above, the first protection member may be made of a resin material; and the second protection member may be made of a metal material.

The high-voltage cable can be protected by the first protection member made of a resin material during normal times. Further, the high-voltage cable can be protected by the second protection member made of a metal material not only during normal times but also in the event of a vehicle collision.

The high-voltage cable protection structure according to the present disclosure includes a highly rigid second protection member that partially covers the high-voltage cable, thereby improving the performance to protect the high-voltage cable in the event of a vehicle collision while suppressing the cost.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Embodiments of the high-voltage cable protection structure according to the present disclosure will be described below. This embodiment is not intended to limit the present disclosure.

Figure 1:
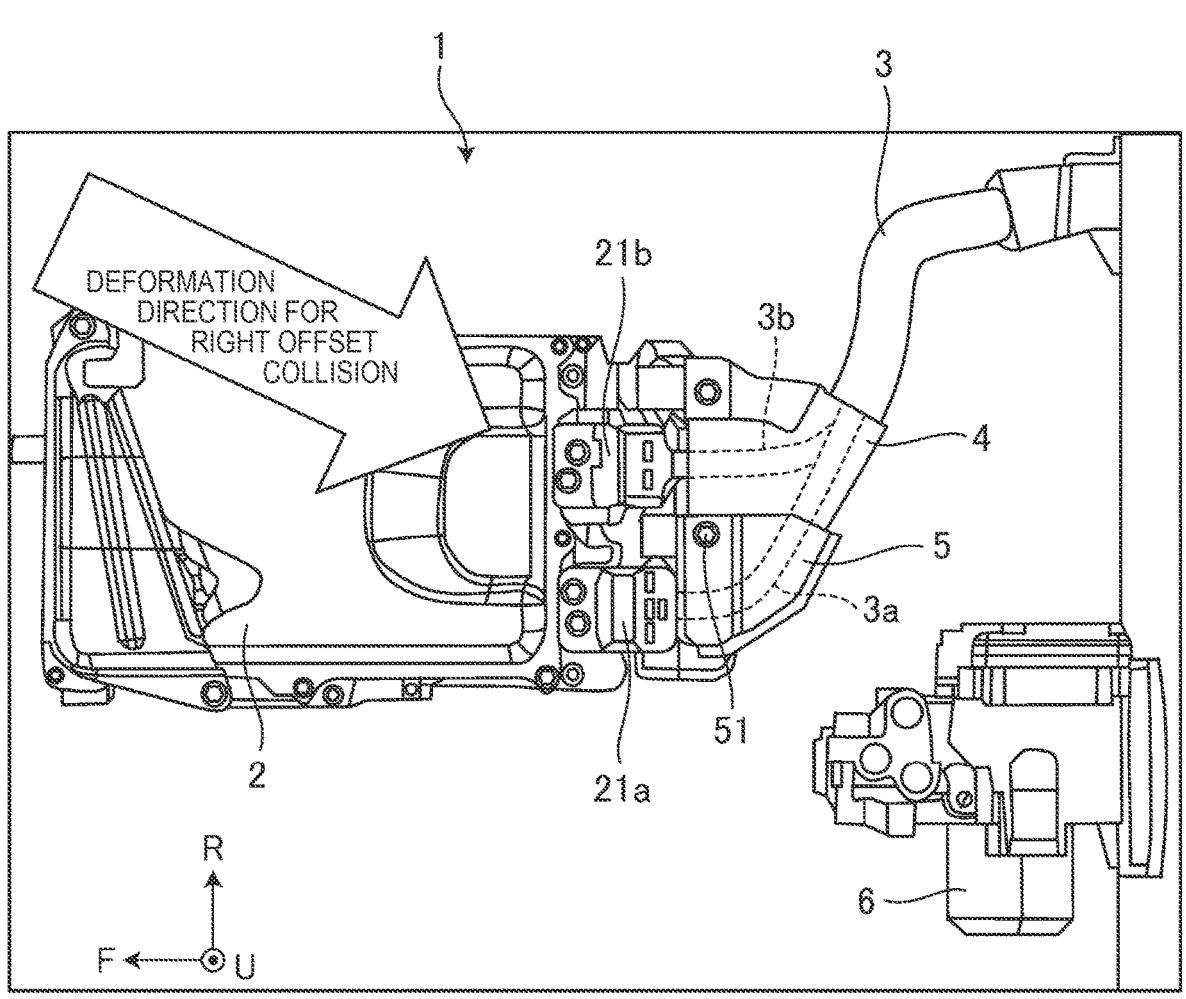
FIG. 1 is a top view of a device layout in a front compartment of an electrified vehicle according to an embodiment.
Figure 2:
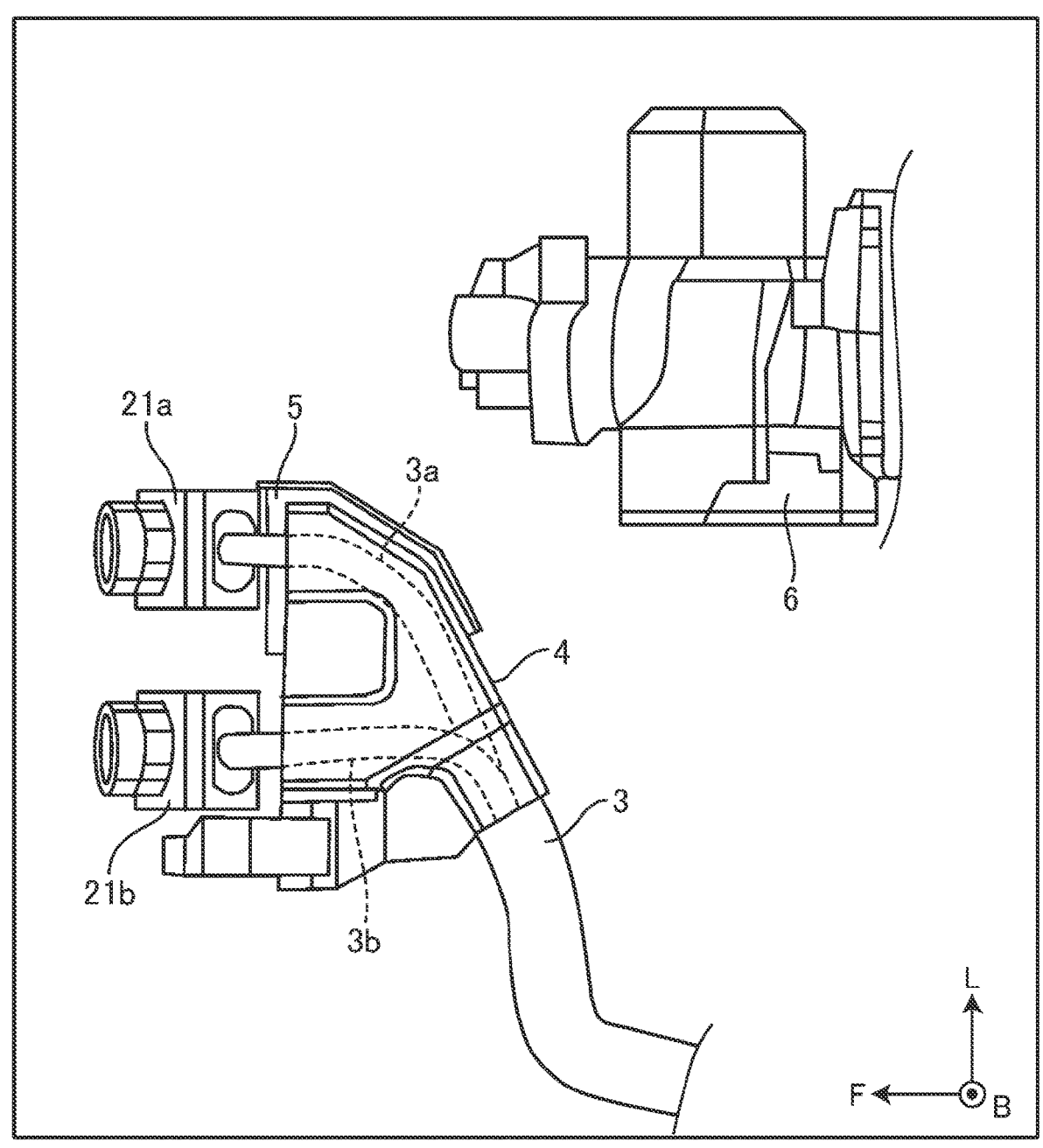
FIG. 2 is a bottom view of the device layout in the front compartment of the electrified vehicle according to the embodiment.

FIG. 1 is a top view of a device layout in a front compartment 1 of an electrified vehicle according to an embodiment. FIG. 2 is a view from below of the device layout in the front compartment 1 of the electrified vehicle according to the embodiment. Note that in FIG. 2, illustration of the PCU 2 is omitted.

The coordinate system in the figure will be explained. The F axis of the coordinate system indicates the front of the vehicle. The R axis of the coordinate system indicates the right direction of the vehicle width. The U axis of the coordinate system indicates the upward direction of the vehicle. The L axis of the coordinate system indicates the left direction of the vehicle. The B axis of the coordinate system indicates the downward direction of the vehicle. Hereinafter, "front" in this specification means "in front" of the vehicle in the longitudinal direction. In this specification, "rear" means "rear" in the longitudinal direction of the vehicle. The front compartment 1 corresponds to the front space of an electrified vehicle.

The front compartment 1 is provided with a Power Control Unit (PCU) 2, a high-voltage cable 3, a resin protector 4, a metal protector 5, a brake device 6, high voltage connectors 21a and 21b, and a motor (not shown). Although various other parts are provided in the front compartment 1, explanations of parts other than those mentioned above will be omitted here as appropriate.

The PCU 2 is, for example, an electric device (power control device) that is fixed above a motor case that houses a motor and controls electric power for driving the motor. Two high voltage connectors 21a and 21b are provided on the rear surface of the PCU 2 housing. The high voltage connectors 21a and 21b are connectors that connect high-voltage cables 3a and 3b, which are branched high-voltage cables 3 into two, to the PCU 2. The high-voltage cable 3 is connected to a high voltage battery (not shown) mounted on the electrified vehicle. The high-voltage cable 3 (high-voltage cables 3a, 3b) extends from the PCU 2 mounted in the front compartment 1 toward the rear of the vehicle.

The high-voltage cables 3a and 3b are covered and protected by a resin protector 4, which is a first protection member made of a resin material. Further, a metal protector 5 is provided between the PCU 2 and the brake device 6. The metal protector 5 has a narrower coverage area than the resin protector 4 over the high-voltage cable 3a. The metal protector 5 is a second protection member that protects the high-voltage cable 3 a by covering the high-voltage cable 3 a through the resin protector 4 on the outside of the resin protector 4. The metal protector 5 has higher rigidity than the resin protector 4. The metal protector 5 is made of a metal material such as steel or aluminum alloy, for example.

The metal protector 5 is, for example, fastened to a bracket fixed to the PCU 2 with a bolt, which is a fastening member. In this embodiment, the metal protector 5 is fastened to the bracket using only one bolt 51 on the upper surface of the metal protector 5, as shown in FIG. 1. Thereby, the mass, material cost, and assembly cost can be reduced compared to the case where there is a plurality of fastening points where the metal protector 5 is fastened to the bracket with bolts.

In the front compartment 1 according to the embodiment, as shown in FIG. 1, a brake device 6, which is a rear component disposed on the left rear side of the PCU 2 in the vehicle, is located. The PCU 2 and the brake device 6 are located at approximately the same height in the vehicle height direction. Here, when the PCU 2 mounted in the front compartment 1 retreats to the rear left of the vehicle due to the impact caused by the right offset collision of the electrified vehicle, the high-voltage cable 3a is caught between the PCU 2 and the brake device 6. In this case, for example, the high-voltage cable 3a may interfere with an edge portion of the brake device 6, and the sheath covering the conductor of the high-voltage cable 3a may be torn. That is, the high-voltage cable 3 may be damaged. In contrast, in the high-voltage cable protection structure according to the embodiment, when the PCU 2 retreats to the rear left of the vehicle due to the impact of a collision, the high-voltage cable 3a and the brake device 6 are prevented from directly interfering with each other. This can be suppressed by the metal protector 5. Thereby, in the high-voltage cable protection structure according to the embodiment, it is possible to suppress damage to the high-voltage cable 3a during a vehicle collision. Therefore, in the high-voltage cable protection structure according to the embodiment, the resin protector 4 protects the high-voltage cables 3a and 3b in normal times, and the metal protector 5 protects the high-voltage cables 3a not only in normal times but also in the event of a vehicle collision, can do.

Further, the metal protector 5 is provided so as to cover only the collision affected range. The collision influence range is a range in which damage or other effects may occur on the high-voltage cable 3a when the PCU 2 retreats to the rear left of the vehicle due to the impact of the right offset collision of the electrified vehicle. Thereby, the mass of the metal protector 5 and the material cost can be reduced more than when the metal protector 5 covers the entire high-voltage cable 3a. Furthermore, the mass and material cost of the metal protector 5 can be reduced compared to the case where not only the high-voltage cable 3a but also the high-voltage cable 3b are covered with the metal protector 5 like the resin protector 4.

Further, the metal protector 5 is provided to prevent the user from accessing the high-voltage cable 3a from above the front compartment 1 with his hands or the like not only in normal situations but also in the event of a vehicle collision. That is, the metal protector 5 is provided so that even if the high-voltage cable 3a is damaged during a right offset collision of an electrified vehicle, the damaged portion will not be exposed to the outside. As a result, the high-voltage cable 3a is protected by the metal protector 5 to prevent the user from touching the damaged area by accessing the damaged area of the high-voltage cable 3a from above the front compartment 1 with his/her hands or the like in the event of a vehicle collision, can do. In this way, the metal protector 5 functions as a contact protection protector that protects the high-voltage cable 3a so that the user does not come into contact with the damaged part of the high-voltage cable 3a from above the front compartment 1.

Further, as shown in FIG. 2, the metal protector 5 is a protection measure against access to the high-voltage cable 3a from above the front compartment 1, so that the lower side of the high-voltage cable 3a is not covered by the metal protector 5. This reduces the mass of the metal protector 5 and the material cost compared to the case where the metal protector 5 covers the lower side of the high-voltage cable 3a while suppressing access to the high-voltage cable 3a from above the front compartment 1.

As described above, in the high-voltage cable protection structure according to the embodiment, it is possible to increase the protection performance of the high-voltage cable 3a in the event of a vehicle collision while suppressing costs.

What is claimed is:

1. A high-voltage cable protection structure in a front compartment of a vehicle, comprising:
    an electric device provided in the front compartment;
    a high-voltage cable that is a conductor covered with a sheath and extends toward a vehicle rear side from the electric device in a vehicle front-rear direction, the high-voltage cable separating into a first branch and a second branch at a terminal portion of the high-voltage cable, the first branch and the second branch respectively being connected to the electric device via a first connector and a second connector;
    a rear component provided in the front compartment, the rear component being disposed rearward of the electric device in the vehicle front-rear direction;
    a first protection member that covers at least a part of a predetermined range of the high-voltage cable, the predetermined range being from a connection portion of the electric device and the high-voltage cable to a separating portion from which the high-voltage cable separates; and
    a second protection member having higher rigidity than the first protection member, the second protection member covering the high-voltage cable from outside of the first protection member in a narrower range than the first protection member.

2. The high-voltage cable protection structure according to claim 1, wherein the second protection member is disposed between the high-voltage cable and the rear component.

3. The high-voltage cable protection structure according to claim 1, wherein:

the first protection member is made of a resin material; and the second protection member is made of a metal material.

4. The high-voltage cable protection structure according to claim 1, wherein:

the first connector and the second connector are aligned in a vehicle width direction;

the rear component is provided on the opposite side of a center point between the first connector and the second connector from the first connector in the vehicle width direction; and the second protection member covers the second branch from outside of the first protection member.

5. The high-voltage cable protection structure according to claim 1, wherein the second protection member is fastened to a bracket fixed to the electric device.

\*   \*   \*   \*   \*